3 Sheets—Sheet 1.

G. B. VAN VORST & J. A. PRATT.
Stand-Pipe for Railway-Stations.

No. 223,416. Patented Jan. 6, 1880.

Witnesses,
E. F. Benham,
D. B. Carver.

Inventors,
GARDNER B. VAN VORST,
—AND—
JAMES A. PRATT.
by
William H. Low,
Attorney.

3 Sheets—Sheet 2.

G. B. VAN VORST & J. A. PRATT.
Stand-Pipe for Railway-Stations.

No. 223,416. Patented Jan. 6, 1880.

Witnesses,

E. F. Benham
D. B. Carver

Inventors,
GARDNER B. VAN VORST,
— AND —
JAMES A. PRATT.
— by —
William H. Low.
Attorney.

N. PETERS, PHOTO-LITHOGRAPHER, WASHINGTON, D. C.

3 Sheets—Sheet 3.
G. B. VAN VORST & J. A. PRATT.
Stand-Pipe for Railway-Stations.
No. 223,416. Patented Jan. 6, 1880.
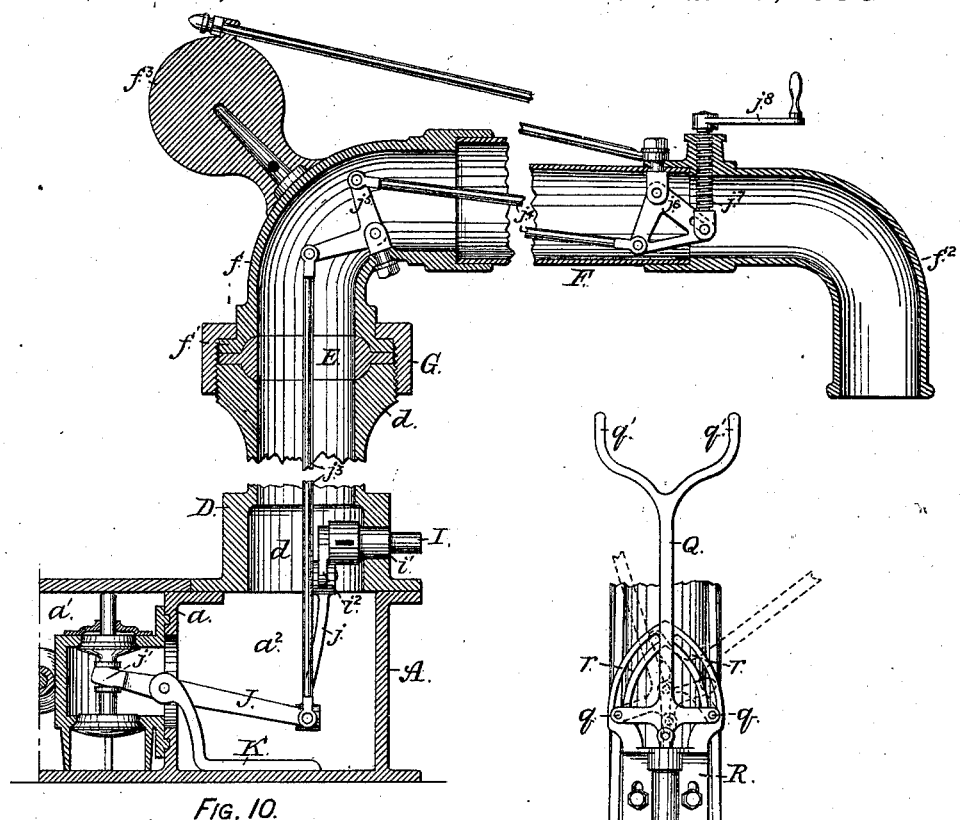
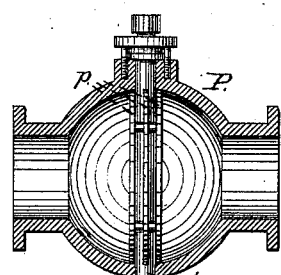
Fig. 10.
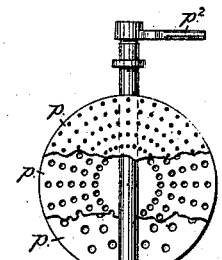
Fig. 9.
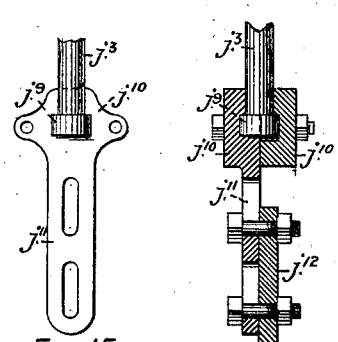
Fig. 13. Fig. 14.
Fig. 15.
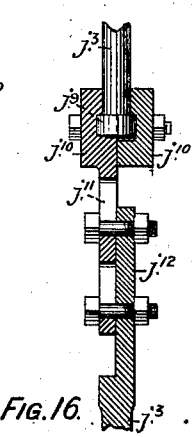
Fig. 16.
Witnesses,
E. F. Benham,
D. B. Caron
Inventors,
GARDNER B. VAN VORST,
AND
JAMES A. PRATT,
by
William N. Low,
Attorney.

UNITED STATES PATENT OFFICE.

GARDINER B. VAN VORST AND JAMES A. PRATT, OF WEST ALBANY, N. Y.

STAND-PIPE FOR RAILWAY-STATIONS.

SPECIFICATION forming part of Letters Patent No. 223,416, dated January 6, 1880.

Application filed October 9, 1879.

*To all whom it may concern:*

Be it known that we, GARDINER B. VAN VORST and JAMES A. PRATT, of West Albany, in the county of Albany and State of New York, have invented certain new and useful Improvements in Stand-Pipes for Railway Water-Stations, of which the following is a full and exact description, reference being had to the accompanying drawings, making a part of this specification, in which—

Figures 1, 2, 6:
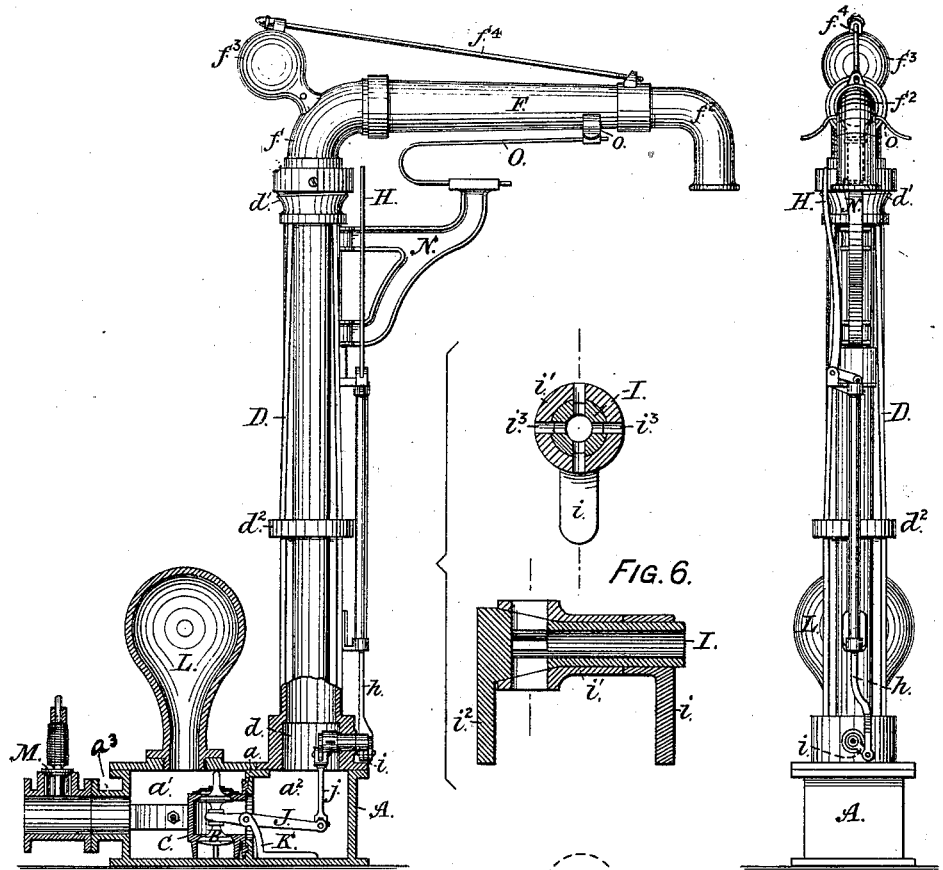
Figure 3:
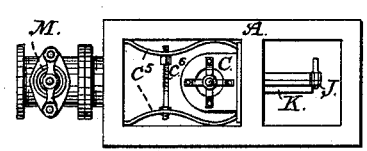
Figure 7:
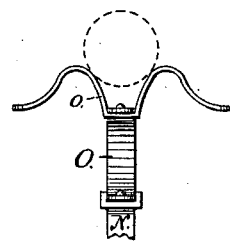
Figure 8:
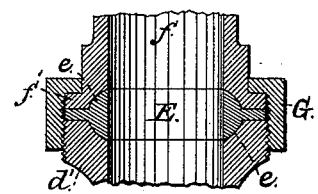
Figure 4:
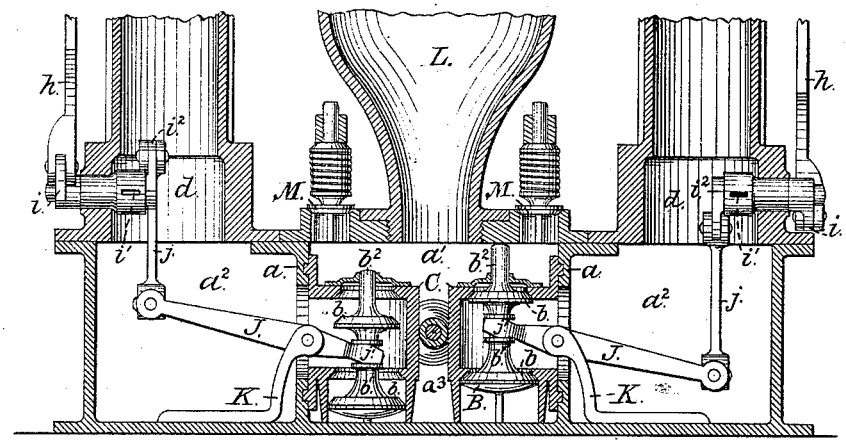
Figures 5, 11, 12:
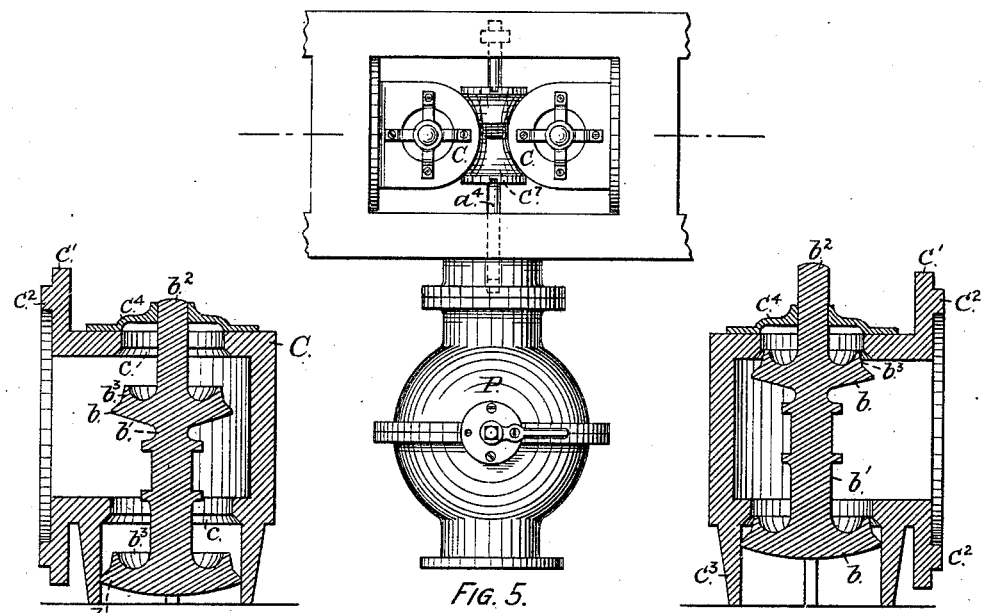

Figure 1 is a side elevation of our improved stand-pipe, the lower portion being shown in section so as to exhibit the construction and arrangement of the internal parts; Fig. 2, an end elevation of same; Fig. 3, a plan view of the base-piece, showing its contained mechanism; Fig. 4, an enlarged longitudinal section of the base-piece and lower portions of a double-column stand-pipe; Fig. 5, a plan view of the central part of same, showing the arrangement of valve-casings; Fig. 6, enlarged and detached longitudinal and transverse sectional views of the hollow shaft and seat, constituting a combined rock-shaft and waste-water cock; Fig. 7, an end view of the spring and cross-piece for securing the crane-pipe against accidental swinging; Fig. 8, an enlarged and detached sectional detail, showing the construction of the joint formed between the head of the standing pipe and crane-pipe; Fig. 9, a double-acting hand-lever for adapting a single stand-pipe for use on a double-track road; Fig. 10, an enlarged vertical section of a modification of our improvement to adapt it for use under an excessive head of water; Figs. 11 and 12, enlarged vertical sections of a modified form of the water-controlling valves; Fig. 13, a longitudinal section of the pressure-reducing valve; Fig. 14, front elevation of valve-spindle and disks for the pressure-reducing valve, showing portions of the disks broken away to exhibit the variable sizes of the holes in the different disks; and Figs. 15 and 16, enlarged details of the joint in the rod used in the modification shown in Fig. 10.

The object of our invention is to provide, for use at railway water-stations, stand-pipes that will be easy to operate, accessible for repairs, enduring in wear, and free from liability to freeze.

The nature of our invention will be readily understood from the following description and accompanying drawings.

As shown in the drawings, A is the base-piece, made in the form of an oblong box, divided by the partition or partitions $a$ to form the valve-chamber $a'$ and either one or two column-chambers, $a^2$. When designed for use with a single column, as shown in Fig. 1, the base-piece has a nozzle, $a^3$, for attaching the water-main thereto, fixed at the end thereof; but when designed for a double column, as shown in Fig. 4, the nozzle $A^3$ is fixed at the side of the base-piece; but in either case it communicates only with the valve-chamber $a'$.

B represents double puppet-valves for controlling the discharge of water, consisting of two valve-disks, $b$, cast with a connecting-stem, $b'$, between them. These valves we preferably arrange in an inverted position, for the purpose of preventing the lodgment of dirt that would prevent the valves from seating properly. A guide-stem, $b^2$, is formed on the valve for guiding its upper end.

C represents detachable valve-casings, provided with valve-seats $c$, adapted to receive the disks $b$ of the valve B, and with a circular flange, $c'$, having a circular tongue, $c^2$, formed thereon, which, when the casing is fixed in position, enters a groove cut in the partition $a$ around the openings in said partition, through which the water passes to enter the column-chambers $a^2$. Suitable guide-fingers $c^3$ are cast on the casings for guiding the lower disk of the valve, and a guide, $c^4$, is secured to the top of the casings for receiving the guide-stems $b^2$. The casings are held in place and rendered readily detachable from the partitions $a$ either by the curved springs $c^5$ (which are expanded lengthwise by the cross-bolt $c^6$, as shown in Fig. 3) or by the conical bolt and nut $c^7$, which we preferably slide on a T-headed stay-bolt, $a^4$, as shown in Fig. 5.

D represents the column or stationary water-pipe, secured in a vertical position to the base-piece A over the column-chambers $a^2$, and, as we preferably construct them, an enlarged chamber, $d$, is formed at its lower end. At its upper end it is provided with an enlarged head, $d'$, having a screw-thread cut on its periphery and at its extremity a concave seat to receive the joint-ring E. Said joint-ring we usually make, of bronze or other material that is not affected by rust, in the form of an annular flange, having on both faces, at its inner diameter, a convex projecting ring, $e$, whose forms are identical and the counterpart of the seats formed in the head $d'$ and the elbow of the crane-pipe, so as to render the joint-ring reversible.

The convex projections $e$ of the joint-ring, while they are of the best form for producing a water-tight joint, would, if used alone, induce rocking motion of the crane-pipe that would soon cause the joint to leak. To remedy this objection the annular flange is extended beyond the outer diameter of the convex projections to form a flat annular seat of uniform thickness, whereon the flat portion of the flange $f'$ rests, as shown in Fig. 8, thereby producing the requisite stability for the joint, while preserving all its leak-preventing qualities.

F represents the crane-pipe, arranged to swing in a horizontal plane on top of the column D, for which purpose said crane-pipe is provided with an elbow, $f$, having a flange, $f'$, in the face of which is a concave seat that fits the projecting rings $e$ of the joint-ring.

By interposing the joint-ring E between the head $d'$ and flange $f'$, and then binding them by the coupling-nut or binding-collar G, a water-tight and anti-freezing joint is produced which forms a pivotal center on which the crane-pipe swings very freely.

By constructing the joint in this manner we dispense with the stuffing-box joint commonly used for the purpose, which, from its liability to freeze during cold weather, has always been a source of great trouble.

The crane-pipe is provided at its outer end with an elbow, $f^2$, for discharging the water downward. A counter-weight, $f^3$, for counter-balancing the overhanging weight of the pipe, is secured to the elbow $f$ by means of a stud fixed to said elbow, as shown in Fig. 10, said stud being adapted to enter an opening cast for that purpose in the counter-weight. Said counter-weight is placed at an angle of about forty-five degrees from a vertical for the purpose of avoiding the danger of being struck by trains on the opposite track. By this we remedy a defect incident to the use of a counter-weight arranged horizontally in line with the crane-pipe, which is the usual mode of arranging the counter-weights on crane-pipes.

H is a hand-lever pivoted to the column D, for the purpose of operating the water-valves through the intermediate mechanism, as follows: Said lever (which should be placed within reaching distance from the track on which the train passes) is connected by the rod $h$ to the arm $i$ of the hollow shaft I, which shaft is adapted to receive a rocking motion in the seat $i'$, fixed in the lower end of the column D. An arm, $i^2$, attached to the inner end of the hollow shaft I and arranged within the column D, is connected, by a link, $j$, to the end of the valve-lever J, pivoted to the bracket K, and provided with a forked end, $j'$, that engages between the collars on the stem $b'$ of the valve B so as to raise and lower the said valve, but leaving it free to turn from the motion derived from the whirling motion of the current of water passing through the openings of the valve-seat.

The hollow shaft I and seat $i'$ are provided with corresponding parts $i^3$, and when together they form a waste-water cock for automatically emptying the column D to prevent it from freezing.

The seat $i'$ is fixed in the column D in such manner that its ports will accord with those in the shaft I (to permit the water to run out of the column D) when its corresponding valve B is closed, and reciprocally the ports in the shaft and seat will not accord (are closed) when the valve B, corresponding to the shaft I that is moved, is open.

The hole in the outer end of the shaft I should be tapped for receiving a screw-plug, which may be used during the warm seasons to prevent the water from flowing out of the column D, thereby saving the water from running to waste.

L represents an air-chamber fixed over the valve-chamber $a'$, which, by reason of its contained air that acts as an elastic cushion, relieves the base-piece from the impact produced by stopping the flow of water.

Still further provision is made for relieving the structure from the impact above referred to by the relief-valves M, which may be placed on the water-supply pipe, as shown in Fig. 1, or on the cover of the valve-chamber, as shown in Fig. 4. Said valves are governed by springs regulated to resist the ordinary pressure of the water; but on the occurrence of any excessive pressure the valve rises from its seat until the cessation of the excessive pressure.

N is a bracket, secured to the column D for receiving the bent leaf-spring O, secured to the end of said spring, and lying crosswise of it there is a double bow-piece, $o$, that forms a seat for holding the outer end of the crane-pipe F, as shown in Figs. 1 and 7, so that the said pipe cannot be blown around by the wind to endanger the safety of a passing train.

When required, the crane-pipe F may be swung around in either direction by first depressing the spring O, so as to clear the bow-piece $o$ from the pipe.

On restoring the crane-pipe to the position shown in Fig. 1 the pipe strikes one of the depressed ends of the bow-piece $o$, and thereby forces the spring O down until the pipe passes over the highest part of the bow-piece, and then the resilient action of the spring carries the notch of the bow-piece up against the pipe, so as to secure it in place.

P represents a pressure-reducing valve consisting of the perforated disks $p$, secured to the spindle $p'$, with which the disks are adapted to revolve, when required, within the globular casing of the valve, and for that purpose a handle, $p^2$, is secured to the spindle where it protrudes outside of the casing.

The disks $p$ are perforated, each one being pierced with holes differing in size and position from either of the others. The object of this arrangement of the perforations is to produce many divisions in the volume of water passing through the water-mains to supply the stand-pipes, and by diverting the course of these small currents from a direct line so as to retard the velocity of the body of water to effect a reduction in the pressure. This arrangement is especially essential in many cities and other places where the stand-pipes are used, where, by reason of an excessive head of water, the base-piece A is liable to be destroyed by the impact produced by shutting off the water; and in such localities the modification of the valve B shown in Figs. 11 and 12 should also be used. In this modified valve (which is shown opened in Fig. 11 and partially closed in Fig. 12) the disks $b$ are provided with a standing flange, $b^3$, that is made slightly tapering, and arranged so as to enter the opening in the seats $c$ in advance of the disks, so as to produce a very gradual closing of the valves.

Another modification of our invention to meet the exigencies of an excessive pressure is shown in Fig. 10; and it consists in connecting the valve-lever J by means of the rods $j^3$ and $j^4$ and the bell-cranks $j^5$ and $j^6$ with the screw $j^7$, which works in a nut fixed to the top of the crane-pipe F, and to which the crank-handle $j^8$ is attached. In this modification the link $j$ forms a connection between the end of the lever J and the arm $i^2$ of the waste-water cock to open and close said said cock. In this construction the rod $j^3$ must be adapted to turn with the swinging movement of the crane-pipe F. This we effect by making the said rod in separate sections, the upper one of which is provided with an enlarged cylindrical head, $j^9$, which is fitted to turn in a recess formed in the clamping-jaws $j^{10}$. One of said jaws is provided with a flattened extension, $j^{11}$, which bolts on the flattened end $j^{12}$ of the lower section of the rod $j^3$. Suitable provision is made for adjusting the length of the rod $j^3$ by means of the slotted holes in the extension $j^{11}$ of the clamping-jaw.

When placed at water-stations where many engines are supplied with water, we prefer to use the double-column stand-pipe, the base-piece of which is shown in Fig. 4, and whose upper work is a duplication of the single one shown in Fig. 1. By placing the double stand-pipe between the up and down tracks the crane-pipe properly appropriated to the engines running on each track can be swung over the tender without striking the cars of the train, and an up and a down train can both be supplied at the same time; but when the single stand-pipe is used on a double-track road for supplying trains moving on the two tracks in contrary directions, the crane-pipe will only swing clear of the cars running on one of the tracks. If running on the other track, the crane-pipe, as it swings around, will strike the cars unless the train is first stopped short of the proper place. The crane-pipe is next swung around partially over the tender, and then the crane-pipe and train are simultaneously moved to the right positions.

In order to render the single stand-pipe convenient to operate from either track of a double-track road, we construct the hand-lever for moving the water-controlling valves in the form shown in Fig. 9. In that figure, Q is the hand-lever, provided at its lower end with a cross-bar, which has a stud, $q$, in each end of it. Said studs serve as pivotal centers, on which the lever moves. At its upper end the said lever is forked to form the two handles $q'$, which are projected outward in the direction of the tracks, so as to bring them to a convenient reaching distance from an engine on either track.

R is a bracket secured to the column D, and having at its upper end a double quadrant provided with the slotted openings $r$, which are curved to conform to the path of one of the studs $q$ when the lever Q is moved, while using the stud in the opposite end of the cross-bar as a center.

The rod $h$ for moving the mechanism for operating the water-controlling valve connects to a point on the cross-bar of the lever below the center of said cross-piece. When the lever Q stands in a vertical position, as shown in the full lines in Fig. 9, the rod $h$ is depressed to close the valves B; but when the lever is moved in either direction, as shown by the dotted lines in said figure, the rod $h$ is raised so as to open the said valve.

When our stand-pipe is used in cold climates, the lower part of it should be placed in a box or crib sunk in the earth deep enough to bring the collar $d^2$ below the surface of the ground, and, as we preferably erect them, with a chamber formed in the box and filled with manure or other good non-conductor of heat, so as to prevent the lower parts from freezing.

In making the joint between the head of the column D and the flange of the elbow of the crane-pipe F, the screw-thread hereinbefore referred to may be omitted from the coupling-nut G and the head $d'$. The coupling-nut is then made to slip freely over the head $d'$, and is secured thereto by means of standing bolts fixed in the said head.

Suitable provision is made for securing a signal-lantern to the bracket of the column, so as to enable the engineer to discover after dark the location of the stand-pipe.

It will be seen that the valve-seats and valves can be readily removed from the chamber $a'$ without disturbing the column D, and that the column can likewise be removed from the bed-piece without interfering with the valves and without shutting off the water from the source from which the supply is derived. By effecting these last-named results we remedy a serious defect heretofore existing in standing pipes arising from their construction, which requires the displacement of the principal parts in order to reach the valves when repairs are needed.

We claim as our invention—

1. The base-piece A, divided by one or more partitions, $a$, to form the valve-chamber $a'$ and column chamber or chambers $a^2$, in combination with one or more water-controlling valves contained in said valve-chamber, and a stationary pipe or pipes, D, secured to the base-piece A over the said column chamber or chambers, as and for the purpose herein specified.

2. In a water-station stand-pipe, the combination, with a base-piece containing separate chambers for the water-controlling valves and standing pipes, as herein described, of the detachable valve-seat and valve and the standing pipe D, arranged in relation to each other, substantially as described, so that either can be removed without disturbing the other, as herein specified.

3. The combination, with the standing pipe D and crane-pipe F, of the joint-ring E, constructed substantially as herein described, and the binding-collar G, as and for the purpose herein specified.

4. The hollow shaft I and the seat $i'$, provided with corresponding ports $i^3$, and arranged to operate as a rock-shaft and a waste-water cock, as herein specified.

5. The combination, with a standing pipe, D, and crane-pipe F, of the water-controlling valve B and hollow shaft or waste-water cock I, said valve and cock being arranged in relation to each other as herein described, and adapted to operate so that as one is opened the other is reciprocally closed, as herein specified.

6. The combination, with the crane-pipe F, of the spring O, provided with the cross bow-piece $o$, arranged in relation to said crane-pipe as herein described, and for the purpose herein specified.

7. The combination of the hand-lever H, rod $h$, and the shaft I, provided with the arms $i$ and $i^2$, with the link $j$, lever J, and valve B, all essentially as herein specified.

8. In a stand-pipe for water-stations, the crane-pipe F, provided with a counter-weight, $f^3$, attached to said crane-pipe by means of a stud, as herein described, and arranged at an angle of about forty-five degrees from the horizontal center line of said crane-pipe, for the purpose of avoiding the danger of passing trains colliding therewith, as herein specified.

9. The reversible joint-ring E, consisting of an annular flange provided with a convex projection, $e$, on each face, at its smaller diameter, and having a flat annular seat of a uniform thickness extending beyond the outer diameter of the convex projections $e$, as and for the purpose specified.

GARDINER B. VAN VORST.
JAMES A. PRATT.

Witnesses:
WILLIAM H. LOW,
E. F. BENHAM.